Dec. 18, 1928.　　　　　　　　　　　　　　　1,695,744
L. F. SAVAGE
STEREOSCOPIC CINEMATOGRAPHY
Filed Jan. 25, 1927　　　3 Sheets-Sheet 1
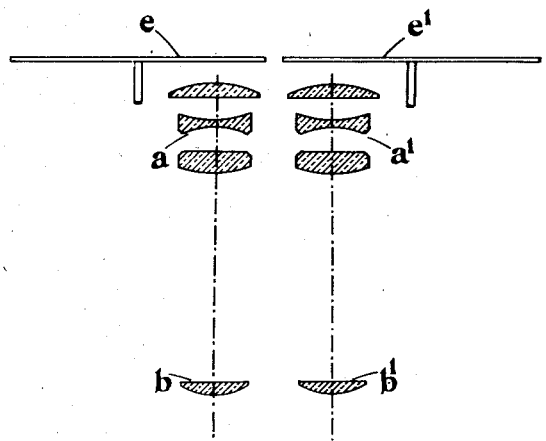
Fig.1.
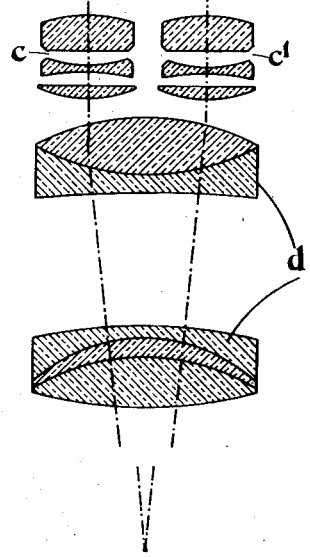
Inventor
L. F. Savage:
by
W. E. Evans
Attorney.

Dec. 18, 1928.

L. F. SAVAGE 1,695,744

STEREOSCOPIC CINEMATOGRAPHY

Filed Jan. 25, 1927   3 Sheets-Sheet 2

Inventor
L. F. Savage:
by
W. E. Evans,
Attorney.

Dec. 18, 1928.

L. F. SAVAGE 1,695,744

STEREOSCOPIC CINEMATOGRAPHY

Filed Jan. 25, 1927     3 Sheets-Sheet 3

Inventor
L. F. Savage:
by
W. E. Evans
Attorney.

Patented Dec. 18, 1928.

1,695,744

UNITED STATES PATENT OFFICE.

LAWRENCE FRANCIS SAVAGE, OF LONDON, ENGLAND.

STEREOSCOPIC CINEMATOGRAPHY.

Application filed January 25, 1927, Serial No. 163,353, and in Great Britain February 6, 1926.

This invention relates to stereoscopic cinematography and more especially to a method and apparatus for securing stereoscopic cinematographic effects in which the respective view point images merge, fade or are dissolved one into the other when photographing, printing the positive copies, or in projection.

In stereoscopic cinematography one of the principal difficulties experienced is parallax which causes oscillation when two or more images photographed from separated eye view points are alternately projected, or double image when the respective images are superposed before or in projection.

Parallax when it is evident, causes discomfort in viewing projected stereoscopic pictures, and it is among the objects of the present invention to minimize its effects whereby substantially true stereoscopic vision of the projected pictures may be obtained without the necessary employment of any special projection apparatus.

According to the present invention a film bearing a series of stereoscopically related images is produced by bringing images collected by two or more separated objective lenses to a focus in the respective focal planes of the lenses, without the use of any screens or the like, so that thus the images produced at the respective focal planes are aerial images and by re-photographing the aerial images so formed by means of a corresponding series of lenses disposed in alignment with the objective lenses at a determined distance from the aerial images and by projecting the images through a superimposing lens, whereby the respective separated view point images may be superposed upon a film disposed at a film gate and by causing one view point image to merge, fade or to dissolve into the other.

According to the invention, moreover, a corresponding series of lenses may be disposed substantially at the respective focal planes of the objective lenses, these lenses being of such focal length that the light rays are bent into more or less parallel beams of light to facilitate the re-photography of the aerial images by the second series of lenses referred to.

According to the invention, moreover, a camera for use in producing a film according to the method of the invention comprises two or more objective lenses adapted to form aerial images in the manner described, a corresponding series of lenses for re-photographing the aerial images, a superimposing lens by which the re-photographed aerial images are superposed upon a film and means for merging, fading or dissolving the separated view point images one into the other. Such means may advantageously comprise a dissolving disc made of a translucent medium which will not cause distortion of the respective images and which may be disposed in front of one or more objective lenses. Alternatively the separated view point images may be caused to merge or fade one into the other by moving the objective or other lenses towards and away from one another.

The invention further comprises the features hereinafter described.

The invention is hereinafter described by way of example with reference to the accompanying diagrammatic drawings in which Figure 1 is a diagram illustrating the arrangement of the optical elements in a stereoscopic camera provided according to the invention.

Figure 4 is a cross-section on the line 4—4, Figure 2, while

Figure 2:
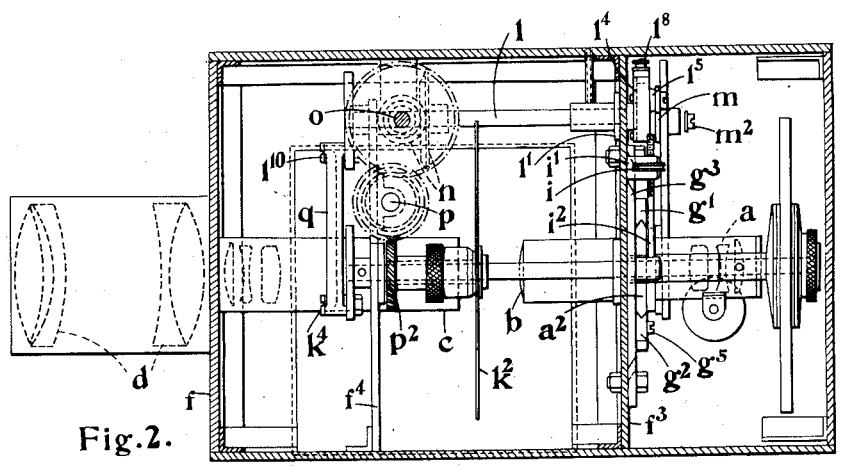
Figure 2 is a sectional side elevation of a stereoscopic camera provided according to the invention.

In carrying the invention into effect with reference to Figure 1 of the accompanying diagrammatic drawings, a camera is provided having two objective lenses $a$, $a^1$ which may be separated by a distance corresponding approximately or substantially to the normal ocular distance of 65 mm., but may, as illustrated in the drawing, be separated by a considerably less distance which has been found in practice to be effective. The lenses $a$, $a^1$ are provided of determined and equal focal length and are adapted to produce at their focal planes corresponding aerial images of the respective views. In position at the focal planes of the objective lenses $a$, $a^1$ or substantially at that position, a pair of lenses $b$, $b^1$ may be disposed, these lenses $b$, $b^1$ advantageously being provided flat on the side which is directed towards the objective lenses $a$, $a^1$ and having for their object to bend the rays of light from the objective lenses $a$, $a^1$ into substantially parallel beams. At a determined position a further pair of lenses $c$, $c^1$ is provided which lenses $c$, $c^1$ are adapted to re-photograph the aerial images formed by the objective lenses $a$, $a^1$ and to project them through a single lens $d$ of suitable focus, whereby the respective view point images may be superposed upon a film gate. The focal length of the pair of lenses $c$, $c^1$ may be advantageously equal to the focal length of the superimposing lens $d$.

In front of the objective lenses $a$, $a^1$ or in any other convenient position a dissolving disc or discs $e$, $e^1$ or the equivalent may be adapted to dissolve one view point image into the other. The dissolving disc or the equivalent may be provided in front of one objective lens only, whereby the intensity of one image only is varied upon the photographic base, the other image remaining constant in its intensity.

The objective lenses $a$, $a^1$ may be coupled together by suitable mechanism in such manner that the ocular distance of the lenses may be adjusted. By such means the superposition of the respective images upon the film may be adjusted with a considerable degree of accuracy.

Instead of providing a dissolving disc or discs $e$, $e^1$ for the purpose of dissolving one view point image into the other, the separated view point images may be caused to merge or fade one into the other by constantly varying the ocular distance between the objective lenses, whereby the plane at which the respective images are superposed may be varied within determined limits, for example, such that the nearest objects and the furthest objects in the separated views are alternatively brought into correct superposition upon the film.

Figure 5:
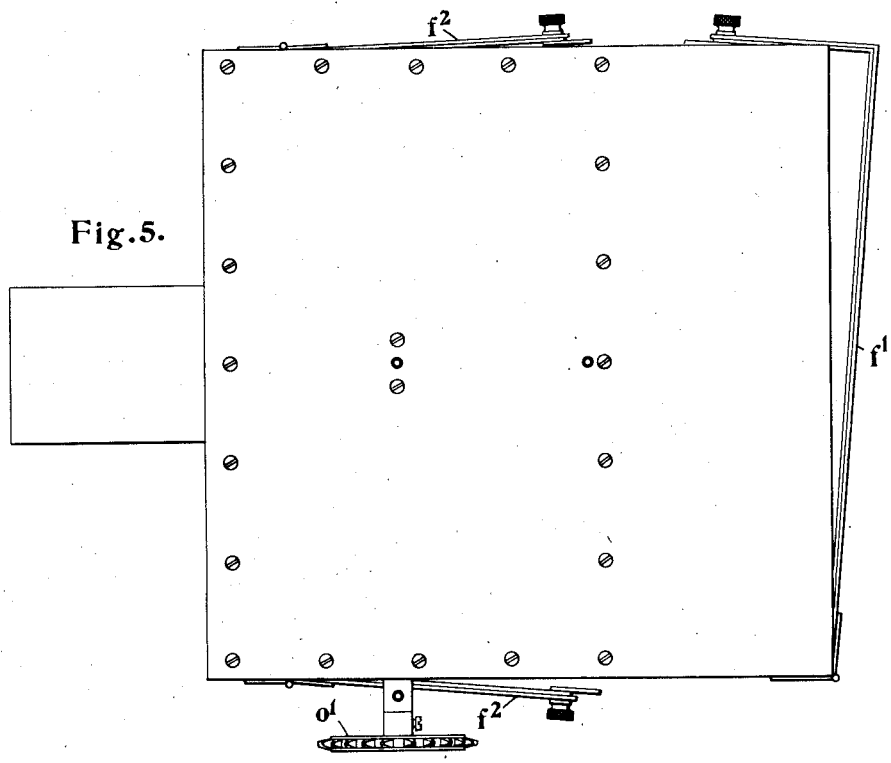
Figure 5 is a plan view of the camera.
Figure 3:
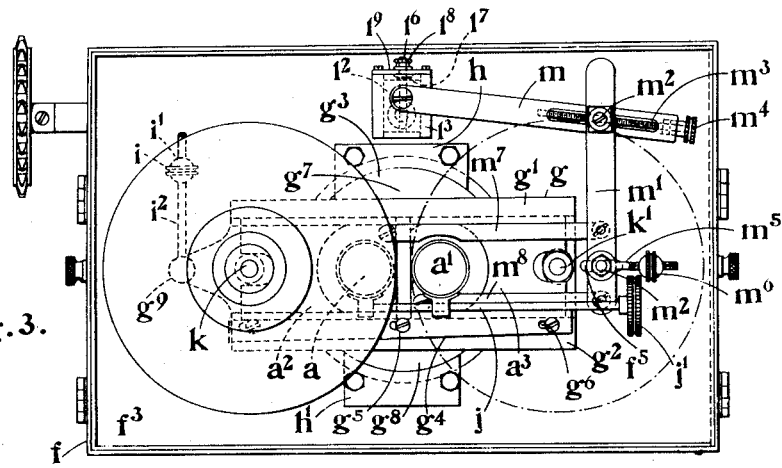
Figure 3 is a front elevation corresponding to Figure 2, the door being removed.
Figure 4:
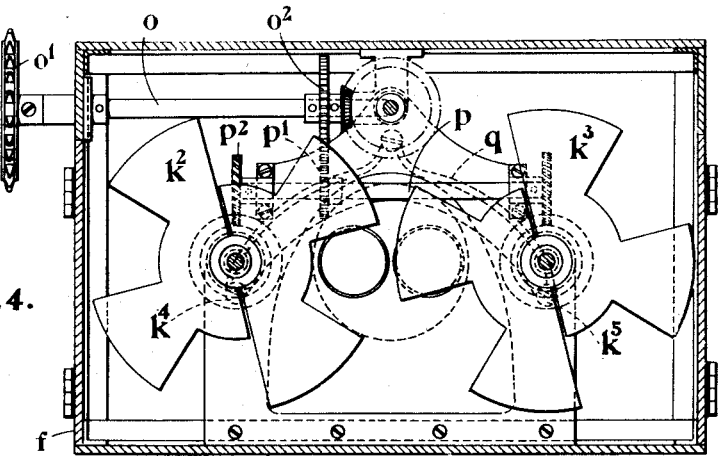

A construction of stereoscopic apparatus in which the optical elements are arranged substantially as hereinbefore described is hereinafter described with reference to Figures 2 to 5 inclusive of the accompanying diagrammatic drawings.

The apparatus may comprise a substantially rectangular box $f$ or casing having a pair of exposure apertures at one end corresponding to the position of the objective lenses $a$, $a^1$ and being provided at the other end with means for the support of the superimposing lens $d$ and for attachment to a cinematographic camera. The front $f$ and one or both sides $f^2$ of the box $f$ or casing are conveniently provided hinged or removable to facilitate access to the mechanism within the camera. The interior of the box $f$ or casing may be divided into two parts by means of a transverse partition $f^3$ which is conveniently disposed immediately at the rear of the objective lenses $a$, $a^1$ and serves for the support of the latter.

The pair of objective lenses $a$, $a^1$ are mounted in slides $a^2$, $a^3$ movable towards or away from one another in a substantially transversely disposed frame $g$. The frame $g$ may comprise upper and lower guide members $g^1$, $g^2$ integrally or otherwise provided upon a vertically disposed plate $g^3$, the plate having apertures therein corresponding substantially to the position of the objective lenses $a$, $a^1$ and the lower guide member $g^2$ being conveniently mounted so as to be capable of limited longitudinal movement with respect to, and upon a slightly inclined part $g^4$ provided upon the plate $g^3$ aforesaid, the lower edge of the lower guide member $g^2$ being correspondingly inclined, and the lower guide member $g^2$ being set in the adjusted position by means of screws $g^5$ passing through longitudinal slots $g^6$ in the guide member $g^2$ and engaging within corresponding screw-threaded holes in the frame carrying plate $g^3$. By such means the distance apart of the upper and lower guide members $g^1$, $g^2$ may be adjusted in such manner that the slides $a^2$, $a^3$ carrying the objective lenses $a$, $a^1$ may move in the frame $g$ freely but without play. The plate $g^3$ carrying the guide members $g^1$, $g^2$ may be provided with upwardly and downwardly extending semi-circular parts $g^7$, $g^8$ which are adapted to be engaged by guide plates $h$, $h^1$ having corresponding semi-circular engaging surfaces, bolted or otherwise secured to the transverse partition $f^3$ aforesaid. The upwardly and downwardly extending semi-circular parts $g^7$, $g^8$ may be bevelled or otherwise provided for engagement with corresponding bevelled or other parts upon the guide plates $h$, $h^1$. By such means the frame $g$ carrying the objective lenses $a$, $a^1$ may be rotatable about an axis disposed mid-way between, and in the same plane, as the axes of the objective lenses. The position of the frame $g$ may be adjusted by means of a nut $i$ rotatably mounted in a forked fitting $i^1$ fixed to the transverse partition $f^3$ aforesaid, and engaging with a screw-threaded rod $i^2$ pivoted at its lower end to a lateral lug $g^9$ or projection at one side of the frame $g$. The objective lenses $a$, $a^1$ may be focussed by means of the usual rack mechanism engaging with pinions upon a spindle $j$ having at its extremity a knob $j^1$ by which it may be rotated.

A pair of shafts or spindles $k$, $k^1$ are mounted with their axes conveniently disposed in the same plane as the axis about which the frame $g$ carrying the objective lenses $a$, $a^1$ is rotatable, the shafts or spindles $k$, $k^1$ being disposed on either side of the pair of objective lenses $a$, $a^1$ whereby dissolving discs $e$, $e^1$ mounted upon the extremities of the shafts or spindles $k$, $k^1$ may extend in front of the respective objective lenses $a$, $a^1$ for the purpose of causing the separated view point images to merge or fade one into the other, while the shafts or spindles $k$, $k^1$ may also serve to carry obturators $k^2$, $k^3$ disposed, for example, in a position between the lenses $b$, $b^1$ and $c$, $c^1$ before referred to with reference to Figure 1. The shafts or spindles $k$, $k^1$ may pass through holes or bearings in the transverse partition $f^3$, and may extend at their rear ends through bearings provided in a transversely disposed supporting plate $f^4$ secured, for example, to the bottom of the box $f$ or casing. The frame $g$ carrying the objective lenses $a, a^1$ may be slotted or otherwise provided to accommodate the shafts or spindles $k, k^1$.

In place of the dissolving discs $e, e^1$, or in addition thereto, means may be provided whereby the ocular distance between the objective lenses $a, a^1$ may be constantly varied, whereby the separated view point images may be caused to merge or fade one into the other. Such means may comprise a shaft or spindle $l$ disposed conveniently in a substantially central position so as to extend, for example, in a position above the frame $g$ carrying the objective lenses $a, a^1$ or otherwise. This shaft or spindle $l$ is supported at its front end in a bearing $l^1$ secured to the transverse partition $f^3$ aforesaid, and at its front extremity may carry a substantially rectangular block $l^2$. The rectangular block may have slidably mounted upon it a trough-like or other part $l^3$, which is retained in position upon the block by means of a closure plate $l^4$ applied at the rear thereof, and having an aperture for the passage of the end of the shaft or spindle $l$ with clearance. The trough-like part $l^3$ carries a crank pin $l^5$ upon its front face, and is provided with means whereby its position with respect to the block $l^1$ may be adjusted and set, which means may comprise a screw-threaded rod $l^6$ engaging within a correspondingly screw-threaded hole in the block $l^1$ and provided at its upper end with means, such as a collar $l^7$ and nut $l^8$ engaging with the upper and lower faces of a transversely disposed bar or part $l^9$ provided at the upper end of the trough-like part $l^3$. It will be understood that by such means the degree of eccentricity of the crank pin $l^5$ with respect to the axis of the shaft or spindle $l$ carrying the block $l^1$ may be accurately adjusted and set. The crank pin $l^5$ may be connected by means of a substantially horizontally disposed rod $m$ to a second substantially vertically disposed rod $m^1$, which latter is pivoted adjacent its lower end upon an axis $m^2$ disposed at one side of the frame $g$ carrying the objective lenses $a, a^1$. Means may be provided for adjusting the position of the pivot $m^2$ connecting the two rods $m, m^1$ together so that it may be varied with respect to the horizontally disposed rod $m$. By such means the ocular distance of the objective lenses may be varied. Thus the pivot $m^2$ may comprise a part rotatably mounted upon the substantially vertically disposed rod, and having a transverse screw-threaded hole for engagement with a screw-threaded rod $m^3$ mounted longitudinally of the substantially horizontally disposed rod $m$, the screw-threaded rod $m^3$ being rotatable, and being provided at its extremity with a knob $m^4$.

It will be understood that in setting the mechanism, the crank pin $l^5$ upon the end of the centrally disposed shaft or spindle $l$ is set in the position in which the objective lenses $a, a^1$ are disposed nearest together, and the position of the point $m^2$ of pivotal connection of the horizontally and vertically disposed rods $m, m^1$ aforesaid is then adjusted, until superposition of the nearest objects in the field is secured, the centrally disposed shaft or spindle $l$ being then rotated through a half revolution to a position at which the objective lenses $a, a^1$ are furtherest apart, and the position of the crank pin $l^5$ being then adjusted so that the superposition of the furthest objects in the field is secured. Thus, it will be understood, that the variation of the ocular distance of the objective lenses $a, a^1$ is such that superposition of the separated view point images varies from the nearest to the furthest objects in the field. This setting of the mechanism is preferred, but it will be understood that the mechanism may be otherwise set to secure the merging or fading effect. The position of the axis $m^2$ upon which the substantially vertically disposed rod $m^1$ is pivoted, may also be adjusted, for example, by mounting the pivot pin carrying the rod within a slot $f^5$ in the transverse partition $f^3$ before referred to, and by providing a screw and nut $m^5, m^6$ adjustment, whereby the pivot $m^2$ may be moved laterally towards or away from the objective lenses $a, a^1$. It will be understood that the pivotal axis $m^2$ of the substantially vertically disposed rod $m^1$ is conveniently disposed substantially in the same plane as the axis, about which the frame $g$ carrying the objective lenses $a, a^1$ rotates, and the slides $a^2, a^3$ in which the objective lenses $a, a^1$ are mounted are connected by means of connecting rods $m^7, m^8$ to the substantially vertically disposed rod $m^1$ referred to, the two connecting rods $m^7, m^8$ being pivoted to the latter at positions respectively above and below its pivotal axis $m^2$. Thus, on rotation of the shaft or spindle $l$ carrying the block $l^2$, the rod $m$ connected to the crank pin $l^5$ is reciprocated, thereby causing an oscillatory movement of the substantially vertically disposed rod $m^1$, the oscillatory movement of the latter causing the slides $a^2, a^3$ in which the objective lenses $a, a^1$ are mounted to move alternately towards and away from one another in a cycle of exposures, for example, sixteen in number. It will be understood that other means of adjustment of the mechanism for varying the ocular distance of the objective lenses may be provided, as well as means for varying the speed at which the lenses move towards and away from one another in relation to the speed of feed of the film, while the respective horizontally and vertically disposed rods $m, m^1$ may be connected together by means of a non-adjustable pivot.

The rotation of the three shafts or spindles $k$, $k^1$, $l$ hereinbefore referred to may be effected in any suitable manner, for example, the centrally disposed shaft or spindle $l$ may be rotated through bevel gearing $n$ by means of a transversely disposed shaft $o$ extending through the wall of the box $f$ or casing, and, having mounted upon its outer extremity a sprocket $o^1$ by which it may be driven. Upon the transversely disposed shaft or spindle $o$, a gear wheel $o^2$ may be mounted adapted to engage with a pinion $p^1$ upon a countershaft $p$ disposed parallel with the transversely disposed shaft $o$, and beneath the centrally disposed shaft or spindle $l$, while the rotation of the counter-shaft $p$ may be communicated to the pair of shafts or spindles $k$, $k^1$ carrying the dissolving discs $e$, $e^1$ and obturators $k^2$, $k^3$, by means of helical or other gearing $p^2$ at the extremities of the counter-shaft $p$. The obturators $k^2$, $k^3$ may conveniently be arranged so that the respective view point images are alternately exposed. In order to ensure that the three main shafts or spindles $k$, $k^1$, $l$ rotate in synchronism, each of the three shafts or spindles may be fitted at its rear end with a disc carrying a crank pin $k^4$, $k^5$, $l^{10}$ respectively, and the three crank pins may be connected by means of a yoke $q$ so that thus the axes of the crank pins $k^4$, $k^5$, $l^{10}$ are always maintained in the same positions with respect to one another. The whole of the mechanism hereinbefore described may be incorporated into a cinematographic camera of suitable construction.

The aerial image produced upon the film consists of two view point images taken from separated eye view points and in which the respective distances between the objects photographed including what is known as the "third dimension", that is the depth or distance separating the objects in the view photograph, from one another and from the objective lenses in the proportion that the size of the picture upon the film bears to the size of the actual view photographed.

A camera according to the invention is capable of photographing films at the usual rate of speed and without material loss of exposure for projection with existing film projectors.

According to a modification, instead of superposing the respective eye view point images upon the same film space at the time of exposure, the respective images may be projected upon alternate film spaces or in any other sequence. The camera hereinbefore described is provided with means for intermittently and continuously feeding the film through a gate in any convenient manner, and may be provided with an obturator.

It will be understood that the invention is not limited to the features of construction and modifications hereinbefore described. For example, the method according to the invention may be carried out in a film printing machine or in a film projector or in any other manner, for instance by photographing two or more view points upon one or more films with one or a plurality of cameras and that although a camera with only two objective lenses has been specifically described more than two lenses may be employed.

Furthermore it will be understood that the optical system may be modified by the provision of prisms or of mirrors and reflectors and the like.

I claim:—

1. An optical system for the production of stereoscopic cinematographic effects comprising in combination a set of separated objective lenses of equal focal length, another set of lenses in alignment with the said set of objective lenses and disposed in the focal planes thereof, said lenses being adapted for the reception of aerial images produced on the respective focal planes of the said objective lenses, a set of re-photographing lenses in alignment with the lenses of the respective sets before referred to and at a determined distance from the aerial images, and a superimposing lens disposed adjacent to the set of rephotographing lenses, substantially as described.

2. A camera for the production of a stereoscopic cinematographic film and comprising in combination a set of separated objective lenses of equal focal length, another set of lenses in alignment with the said set of objective lenses and disposed in the focal planes thereof, said lenses being adapted for the reception of aerial images produced on the respective focal planes of the said objective lenses, a set of re-photographing lenses in alignment with the lenses of the respective sets before referred to and at a determined distance from the aerial images, a super-imposing lens disposed adjacent to the set of re-photographing lenses, and means for causing the separated view point images to merge, fade or dissolve one into the other, substantially as hereinbefore described.

3. A camera for the production of a steroscopic cinematographic film and comprising in combination a set of separated objective lenses of equal focal length, another set of lenses in alignment with the said set of objective lenses and disposed in the focal planes thereof, said lenses being adapted for the reception of aerial images produced on the respective focal planes of the said objective lenses, a set of re-photographing lenses in alignment with the lenses of the respective sets before referred to and at a determined distance from the aerial images, a super-imposing lens disposed adjacent to the set of re-photographing lenses, means for causing the separated view point images to merge, fade or dissolve one into the other said means comprising dissolving discs, substantially as hereinbefore described.

4. An optical system for the production of stereoscopic cinematographic affects comprising in combination a set of separated objective lenses of equal focal length, another set of lenses in alignment with the said set of objective lenses and disposed in the focal planes thereof, said lenses being adapted for the reception of aerial images produced on the respective focal planes of the said objective lenses, a set of re-photographing lenses in alignment with the lenses of the respective sets before referred to and at a determined distance from the aerial images, a superimposing lens disposed adjacent to the set of re-photographing lenses, and means for causing the separated view point images to merge or fade one into the other by constant variation of the ocular distance between the said objective lenses, substantially as hereinbefore described.

LAWRENCE FRANCIS SAVAGE.